United States Patent [19]

White

[11] 4,262,392
[45] Apr. 21, 1981

[54] WIRE BELT SPLICER

[75] Inventor: Donald W. White, Fond du Lac, Wis.

[73] Assignee: Stoelting, Inc., Kiel, Wis.

[21] Appl. No.: 21,515

[22] Filed: Mar. 19, 1979

[51] Int. Cl.$^3$ .............................................. F16G 3/00
[52] U.S. Cl. ..................................... 24/36; 24/23 W; 24/38; 24/39
[58] Field of Search ................... 24/36, 38, 39, 23 W, 24/23 EE, 129 W; 5/110, 260; 312/213

[56] References Cited

U.S. PATENT DOCUMENTS

| | | | |
|---|---|---|---|
| 355,068 | 12/1886 | Felsberg | 24/36 |
| 496,255 | 4/1893 | Gasking | 24/38 |
| 771,279 | 10/1904 | Sirois | 24/36 |
| 839,955 | 1/1907 | Reed et al. | 24/38 |
| 1,137,409 | 4/1915 | Linderman | 24/36 |
| 1,444,103 | 2/1923 | Boyd | 24/23 W |
| 2,814,845 | 12/1957 | Hjort | 24/36 |
| 2,885,164 | 5/1959 | Hooper | 24/39 |
| 3,571,862 | 3/1971 | Bemek | 24/36 |
| 3,971,082 | 7/1976 | Crosby et al. | 5/260 |

FOREIGN PATENT DOCUMENTS 713474  8/1954  United Kingdom .................... 24/23 W Primary Examiner—Victor N. Sakran
Attorney, Agent, or Firm—Wheeler, Morsell, House & Fuller

[57] ABSTRACT

A device for splicing the free ends of a wire belt comprised of pivotally interlocked laterally extending zigzag-shaped and longitudinally spaced apart wires or strips. The zigzag shape of each wire or strip results in each end of the belt having longitudinally extending laterally spaced apart loops with laterally extending sections which are disposed in complementary relationship with the space between loops in the opposite belt end. The splicer is composed of a metal strip having a plurality of laterally spaced apart hook portions corresponding with the loops and projecting integrally from the edge in staggered relationship with similar hook portions at the other edge of the strip. The hook portions engage and form a pivotal connection with the laterally extending sections in the adjacent free ends of the belt.

6 Claims, 7 Drawing Figures

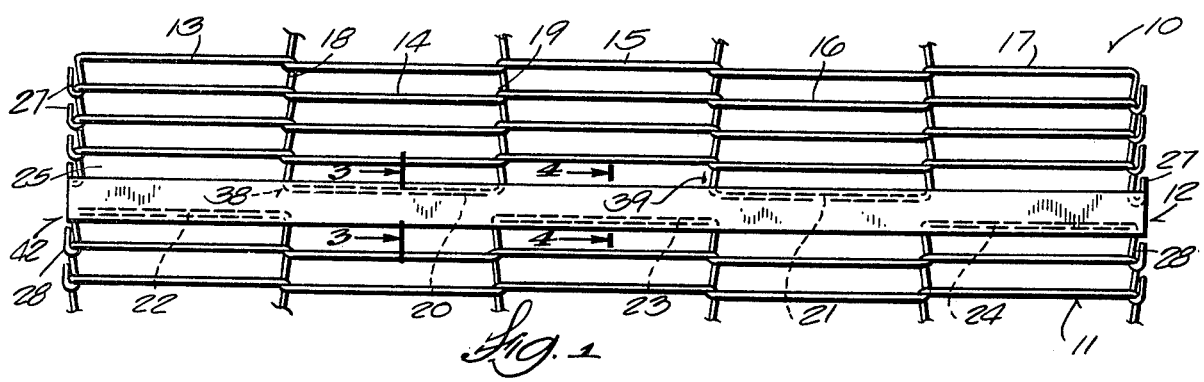
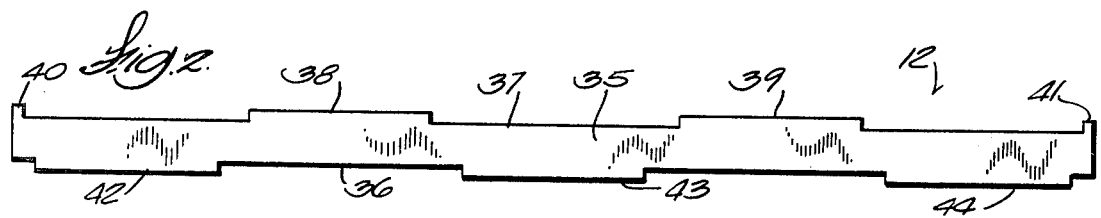
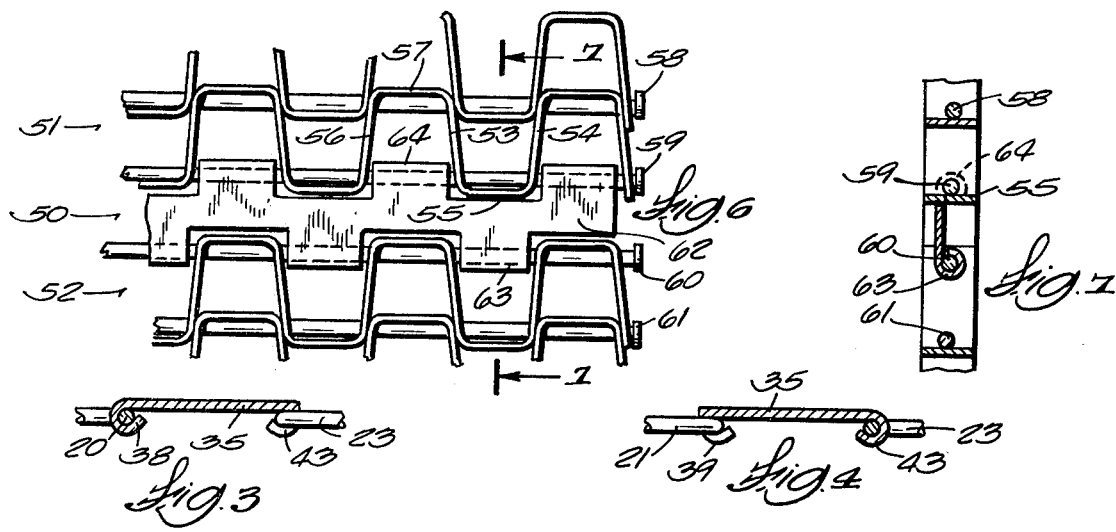
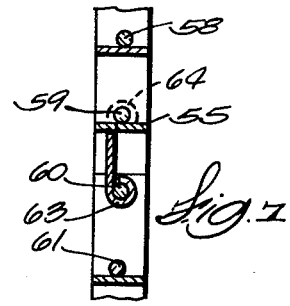
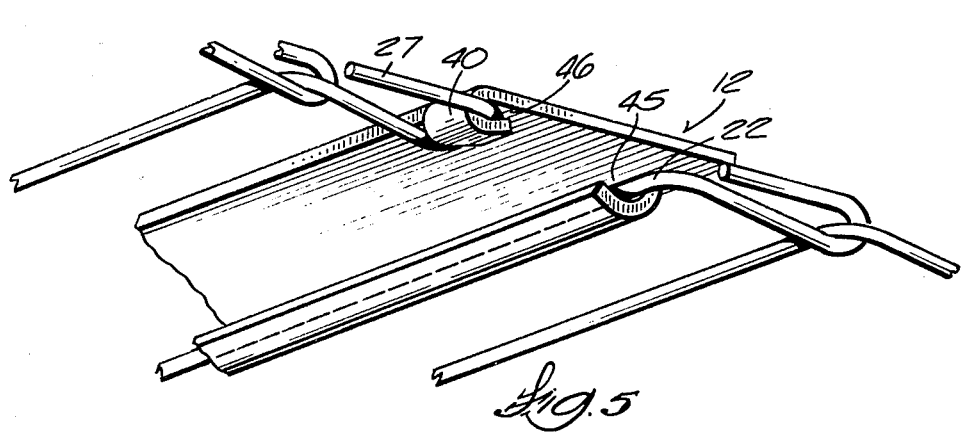

WIRE BELT SPLICER

This invention relates to a device for splicing flexible wire belts.

A first type of wire belt which exemplifies the splicing problems which the new splicer mitigates is composed of a multitude of generally laterally extending wires having a total length corresponding substantially with the width of the belt. The wires are formed in a zigzag fashion, that is, with oppositely directed periodic loop portions which hook over corresponding loop portions in adjacent wires to form pivotal connections and, hence, a flexible belt. The wires are formed with small hooks at their ends for engagement and pivotal connection in corresponding loops on adjacent wires.

Heretofore, the free ends of this kind of belt have been spliced to form a closed loop belt by using a preformed, relatively stiff wire which could be threaded in a prescribed fashion through the wire loops on opposite ends of the belt to connect them together. The proper way of carrying out the splicing procedure was not self-evident and required very explicit pictorial instructions from the manufacturer which had to be followed rigorously to perform the splicing procedure successfully. In any event, a substantial amount of skill was required to make a satisfactory splice and much time was required to do so.

A second type of wire belt is comprised of metal strips which stand edgewise and are formed in a zigzag fashion. The overall length of the strips equals the width of the belt. The zigzag shape amounts to having a sequence of longitudinally projecting loops with closed ends and free spaces between them. The loops on any one strip project into the free spaces between loops on any adjacent strip and the interdigitated and complementary loops are coupled for pivoting with a cross pin that extends through these loops. Heretofore, the free ends of this type of belt were spliced to form a closed loop belt by placing the belt under tension to accomplish interdigitation and alignment and then a cross pin was pressed through the aligned holes in the zigzag loops to keep them pivotally connected. The cross pin at the splice had to be secured against sliding out laterally by swaging or welding or clinching its ends which was difficult and inconvenient to do in the field, that is, away from the factory in which belts of this type are made.

SUMMARY OF THE INVENTION

An object of the present invention is to overcome the above-noted disadvantages with a new splicing device which is so designed that its use is self-evident and which will enable making satisfactory splices rapidly and easily. A preferred embodiment of the new splicing device comprises a metal strip or body having a length corresponding substantially with the width of the wire belt. The strip has hook portions formed integrally with it on opposite edges. The hook portions on one edge are in staggered relationship with the hook portions on the opposed edge so that there are hook portions and laterally extending spaces between the hook portions arranged in alternate fashion on the opposite edges. To use the device with the first type of belt, the free ends of the belt are juxtaposed to each other and preferably stretched toward each other. The hook portions on one edge of the splicer strip are then hooked over the longitudinally projecting loops on one end of the belt and the hook portions on the other edge of the strip are hooked over the alternate loops on the other end of the belt. Inherent tension in the belt tends to enlarge the gap between the belt ends and thereby creates a tension which assures that the projecting loops will be retained in the splicer hook portions and will form a pivotal connection therewith so that flexibility of the wire belt will not be impaired.

Use of the splicer with the second type of so-called wire belt is similar except that the hooks on one edge of the splicer strip are engaged with a cross pin in one free end of the belt and the hooks on the other edge of the strip are engaged with a cross pin in the other free end of the belt. As is true in both examples, the hooks on one edge can be crimped or partly closed after splicing and the opposite edge hooks can be left fully open to facilitate unhooking or disconnecting the splice when that is desired.

In a more detailed description of a preferred embodiment of the invention will now be set forth in reference to the drawing.

DESCRIPTION OF THE DRAWING

FIG. 1 shows a plan view of the opposite ends of a wire belt between which the new splicing device has been installed;

FIG. 2 is a plan view of a metal stamping which is subjected to additional manufacturing operations to form a finished splicing device;

FIG. 3 is a section taken on a line corresponding with 3—3 in FIG. 1;

FIG. 4 is a section taken on a line corresponding with 4—4 in FIG. 1;

FIG. 5 is a perspective of a fragment of the belt and splicing device as viewed from the bottom left side in FIG. 1;

FIG. 6 is a plan view of a fragment of the opposite ends of a second type of wire belt between the slightly modified version of the new splicing device has been installed; and FIG. 7 is a section taken on a line corresponding with 7—7 in FIG. 6.

DESCRIPTION OF A PREFERRED EMBODIMENT

FIG. 1 shows the opposite ends 10 and 11 of a wire belt which are joined together by the new splicing device which is generally designated by the numeral 12. The belt is comprised of a plurality of generally parallel periodically offset or zigzag shaped wires which are formed similarly and are interlocked in longitudinally spaced relationship with each other. A typical wire is comprised of offset laterally extending sections 13-17. Alternate laterally extending wire sections such as 14 are continuous with longitudinally extending wire sections such as 18 and 19 which, together, form longitudinally projecting loops. A typical loop as just described projects toward splicing device 12 and toward one free end of the belt which is to be spliced. In this example, belt end 10 terminates in two longitudinally extending loops 20 and 21. The other end 11 of the belt has three longitudinally extending loops 22, 23 and 24 which are aligned with and in complementary relationship with the spaces such as 25 which occur periodically between loops 20 and 21 on belt end 10.

The laterally extending periodically offset belt wires each have small hooks such as those marked 27, 27' and 28, 28' at their opposite ends. These hooks engage the ends of the succession of generally parallel zigzag wires that form the belt. All of the wires are interleaved with each other, as shown, so that they each pivot on the next adjacent wire and provide a belt with substantial flexibility.

Wire belts of the type described heretofore and comparable types are available commercially. A typical belt is one identified by the tradename "Flat Flex" obtainable from the Wire Belt Company of America, located in Winchester, Mass. These belts are designed for running on sprockets, not shown, which have teeth at a pitch corresponding with the pitch of the spaced apart laterally extending periodically offset wires which comprise the belt.

A plan view of a strip metal blank out of which the new wire belt splicing device 12 is formed, after undergoing some additional manufacturing operations, appears in FIG. 2. It is a unitary device comprised of a strip-like body 35 having longitudinally opposite parallel edges 36 and 37. Extending integrally from edge 37 are two tongue portions 38 and 39 which have substantial lateral width and small longitudinal length. There are laterally narrow tongue portions 40 and 41 at opposite ends of strip 35 but these could be omitted because the other large hooks form a high integrity splice by themselves. Extending integrally from edge 36 are three laterally spaced apart tongues 42, 43 and 44 which align with spaces between tongues on the opposite edge 37 of the strip. As part of the splicer manufacturing process, the tongues 38–44 on the blanked strip shown in FIG. 2 are bent around and over the strip body 35 so that they form open-sided hooks into which the wire size used to form the belt will fit and form a pivotal connection. The hook portions which are formed from the tongues 38–44 in FIG. 2 have been assigned corresponding reference numerals after they have been formed into hook portions as is the case in FIGS. 1 and 3–5. The hook portions on one edge of the strip have their side openings presented toward the hook portions on the other edge of strip 35.

The configuration of a typical splicer hook portion 42 can be seen in FIG. 5. The hook has an open side 45 for receiving within it a laterally extending or cross wire section 22, comprising one of the longitudinally extending loops. The laterally narrow hook portion 40 on the other edge of strip 35 also has an open side 46 to enable receiving one of the small hooks 27 which occurs on the end of each of the laterally extending wires that comprise the belt, but as stated, small hook 40 and 41 too could be omitted.

The FIG. 3 sectional view shows how one of the hooks 38 on the splicer body 35 engages with and forms a pivotal connection with a wire loop 20 which projects longitudinally from end portion 10 of the type of belt shown in FIG. 1. This view also shows how the next laterally spaced splicer hook 43 engages with and forms a pivotal connection with opposite longitudinally projecting loop 23 at the other free end 11 of the belt. FIG. 4, which is the section on the line 4—4 in FIG. 1, shows how the next laterally displaced hook portion 43 engages with wire loop 23 which projects longitudinally from the free end portion 11 of the belt. The hook portion 39 on the edge of strip 35 opposite from hook portion 43 hooks over the next wire loop 21 which projects longitudinally from the free end 10 of the belt. The side openings on the hook portions of the splicer strip should be dimensioned so that the wire section which they receive enters with a little resistance when the two ends of the belt are being joined with the splicer. Inherent tension on the belt when it is installed on its sprocket assures that the longitudinally projecting loops on the belt will not be able to release from the hook portions inadvertently but capture of the wires in the hook portions on one of the splicer strips can be augmented by squeezing the hook portions to close their side openings to a size a little less than the diameter of the belt forming wires. The hooks on the edge of the splicer strip can be left open so the ends of the belt can be easily uncoupled when desired.

When the new splicer is used with a belt that links adjacent zigzag laterally extending metal strips together with cross pins, the cross pin portions spanning between laterally adjacent loops act as equivalents to the laterally extending wire portions such as 20 and 21 on one belt end and 22, 23 and 24 on the other end. That is, the splicer hooks such as 38 and 39 can hook over cross pin portions between loops on one end of the belt and the splicer hooks such as 42, 43 and 44 can hook over cross pin portion between loops on the other end of the belt.

A second type of so-called wire belt which may be spliced with a splicer having the basic characteristics of the one which has been described in detail is shown in FIGS. 6 and 7. Belts of this type are available from Ashworth Bros., Inc., Winchester, Va.

FIG. 6 shows opposite free ends of the belt spliced or coupled together with a version of the new splicer which is designated generally by the numeral 50. The belt is composed of a plurality of metal strips such as the belt end strips 51 and 52 which are viewed from their edges in this figure. The strips are all alike and have a zigzag or serpentine shape and thus comprise a plurality of alternate adjacent loops such as the one which is comprised of longitudinally extending side portions 53 and 54 and a laterally extending end portion 55 between them which closes this loop on one side. The adjacent loop is composed of side portions 53 and 56 and end portion 57. The zigzag strips are interdigitated and hinge together with a plurality of headed pins such as those marked 58–61 to form a belt. The sides of the loops have holes for the pins to pass through.

Splicer 50 is comprised of a flat body portion 62 and has hooks such as those marked 63 and 64 extending integrally from the body at its opposite longitudinally spaced apart edges. The hooks on one edge are staggered laterally relative to the hooks on the other edge so the hooks can interdigitate with the open sides of the loops in the zigzag strips on respectively opposite free ends 50 and 51 of the belt.

The procedure for making a splice simply involves hooking all of the hooks corresponding with hook 63 onto pin 60, for example. This set of hooks can be squeezed down sufficiently to assure that the splicer will not skip off pin 60 but not so much as to prevent the splicer from pivoting freely on the pin. FIG. 7 shows hook 63 fully squeezed or crimped. The next step is to pull belt ends 50 and 51 toward each other to permit hooking the set of hooks corresponding with hook 64 onto pin 59. This set of hooks need not be squeezed to maintain engagement with pin 59. Inherent belt tension will maintain engagement. Leaving one set of hooks uncrimped permits uncoupling the belt ends easily when removal of the belt is desired from the sprockets, not shown, on which the belt runs in a machine.

Although structural features and use of the new splicer has been described in considerable detail in relation to particular wire belt types, it should be understood that such description is intended to be illustrative rather than limiting, for the basic features of the new splicer may be variously embodied for use with other wire belts and should be limited in scope only as prescribed by the claims which follow.

I claim:

1. A wire belt splicer comprising:
 a strip for extending laterally of a wire belt and between the ends of the belt which are to be coupled, said strip having opposite longitudinally spaced apart edges,
 a plurality of laterally spaced apart hook portions extending from said opposite edges of the strip with the opening sides of the hook portions on one edge being presented toward the opening sides of the hook portions on the opposite edge, the hook portions on one edge of the strip being aligned in the longitudinal direction of the strip substantially with the space between hook portions on the opposite edge of the strip.

2. The splicer as claimed in claim 1 wherein the plurality of hook portions includes an individual hook portion at each of the opposite lateral end extremities of said strip which individual hook portions have a substantially smaller lateral dimension than the hook portions intermediate of said ends.

3. The splicer as claimed in any of claims 1 or 2 wherein said strip and hook portions are composed of metal and said hook portions extend integrally from said strip.

4. A device for splicing the ends of a wire belt which is composed of a sequence of longitudinally spaced apart pivotally interlocked wire elements extending laterally of the belt, wires at opposed ends of the belt having longitudinally projecting laterally spaced apart loops formed in them, the loops on one end of the belt being generally alignable with portions of the wire defining the space between loops on the other end of the belt, said coupling comprising:
 a strip for extending laterally of the belt between the ends of the belt which are to be coupled, said strip having longitudinally spaced apart edges,
 a plurality of laterally spaced apart hook portions formed integrally from opposite edges of said strip with the opening side of the hook portions at one edge being presented toward the opening side of the hook portions at the other edge, the hook portions at one edge of the strip being aligned with the spaces between hook portions at the other edge to enable said hook portions at respectively opposite edges to hook over the projecting loops on corresponding belt ends and form a pivotal connection therewith.

5. The device as claimed in claim 4 wherein said sequence of wires composing said belt each have a loop formed in their opposite ends and said plurality of hook portions includes individual hook portions extending from the same edge of said strip at each of the opposite end extremities of said strip, said individual hook portions being dimensioned to hook into said loops at the wire ends to form a pivotal connection therewith.

6. A device for splicing the ends of a wire type belt which is composed of a sequence of elongated elements having an overall length in the lateral direction substantially equal to the width of the belt, wherein each elongated element has a zigzag shape to thereby define a sequence of adjacent loops which project alternately in opposite longitudinal directions of the belt and which loops each have a closed end and an open end alternating with each other across the width of belt, the closed ends of the loops on one elongated element being interdigitated with the open ends of the loops on the next longitudinally adjacent element and pin means extending laterally through the interdigitated loops to hinge them together to form a continuous belt, and an improved splicer for joining the free ends of the belt to form a closed belt, said splicer comprising:
 a strip for extending laterally of the belt between ends of the belt which are to be spliced together, said strip having longitudinally spaced apart edges,
 a plurality of laterally spaced apart hook portions extending from opposite edges of said strip with the hook portions on one edge being aligned with spaces between hook portions at the other edge to enable said hook portions on one edge of said strip to engage with sections of a cross pin extending across the open sides of said loops in one end of said belt and to enable said hook portions on the other edge of said strip to engage with sections of a cross pin extending across the open sides of said loops in the other end of said belt.

* * * * *